(12) United States Patent
Wipiejewski

(10) Patent No.: US 7,592,615 B2
(45) Date of Patent: Sep. 22, 2009

(54) OPTICAL RECEIVER WITH A MODULATED PHOTO-DETECTOR

(75) Inventor: Torsten Wipiejewski, Hksar (CN)

(73) Assignee: Hong Kong Applied Science and Technology Research Institute Co., Ltd., Hong Kong SAR (CN)

( * ) Notice: Subject to any disclaimer, the term of this patent is extended or adjusted under 35 U.S.C. 154(b) by 0 days.

(21) Appl. No.: 11/246,306

(22) Filed: Oct. 11, 2005

(65) Prior Publication Data

US 2007/0080286 A1 Apr. 12, 2007

(51) Int. Cl.
*G01N 21/86* (2006.01)
*G01C 3/08* (2006.01)

(52) U.S. Cl. .................. 250/559.38; 356/5.01
(58) Field of Classification Search ........... 250/559.38; 356/5.01–5.09
See application file for complete search history.

(56) References Cited

U.S. PATENT DOCUMENTS

| | | | |
|---|---|---|---|
| 5,180,922 A | | 1/1993 | Hug |
| 5,206,697 A | * | 4/1993 | Schwartz ............ 356/5.06 |
| 5,214,526 A | | 5/1993 | Tonomura |
| 5,220,164 A | * | 6/1993 | Lieber et al. ........ 250/214 VT |
| 5,534,992 A | * | 7/1996 | Takeshima et al. ...... 356/5.1 |
| 5,631,555 A | * | 5/1997 | Takahashi et al. ........ 324/96 |
| 6,100,517 A | * | 8/2000 | Yahav et al. ........ 250/208.1 |
| 6,515,740 B2 | | 2/2003 | Bamji et al. |
| 6,587,187 B2 | * | 7/2003 | Watanabe et al. ...... 356/5.01 |
| 6,753,950 B2 | | 6/2004 | Morcom |
| 6,822,681 B1 | * | 11/2004 | Aoki ............ 348/296 |
| 6,897,465 B2 | * | 5/2005 | Remillard et al. ...... 250/559.38 |
| 7,009,690 B2 | * | 3/2006 | Kamon et al. ........ 356/3 |
| 2001/0046317 A1 | * | 11/2001 | Kamon et al. ........ 382/154 |
| 2001/0055482 A1 | * | 12/2001 | Braun et al. ........ 396/89 |
| 2003/0178578 A1 | * | 9/2003 | Rao et al. ........ 250/458.1 |
| 2004/0021057 A1 | * | 2/2004 | Drowley ........ 250/208.1 |
| 2006/0124832 A1 | * | 6/2006 | Harmon et al. ...... 250/214 R |

FOREIGN PATENT DOCUMENTS

| | | |
|---|---|---|
| CN | 1449501 | 10/2003 |
| CN | 1466692 | 1/2004 |
| CN | 1643397 | 7/2005 |
| DE | 195 20 663 | 12/1996 |
| JP | 05-063648 | 3/1993 |

OTHER PUBLICATIONS

International Search Report mailed by the International Bureau on Feb. 1, 2007 in corresponding PCT/CN2006/002507.

* cited by examiner

*Primary Examiner*—Thanh X Luu
(74) *Attorney, Agent, or Firm*—Buchanan Ingersoll & Rooney PC

(57) ABSTRACT

A distance measuring apparatus includes an optical transmitter having an optical source for transmitting modulated optical signals towards a remote object, and an optical receiver for detecting the modulated optical signals upon reflection from the remote object. The optical receiver includes a photo-detector which is configured for gated detection of optical signals by gating signals applied thereto. The gating signals are arranged to be in a constant time or phase relationship with the modulated optical signals. The optical receiver calculates the distance of the remote object with reference to delay information between transmitted and detected optical signals, with the delay information being determined by gated detection of optical signals at the photo-detector.

22 Claims, 5 Drawing Sheets

OPTICAL RECEIVER WITH A MODULATED PHOTO-DETECTOR

FIELD OF THE INVENTION

This invention relates to optical receivers and, more particularly, to optical receivers with modulated photo-detectors. More specifically, although not exclusively, this invention relates to optical receivers for optical remote sensing and/or optical distance measurement.

BACKGROUND OF THE INVENTION

Optical devices are widely used in sensing, monitoring, control and communication systems. A typical optical system comprises an optical transmitter and an optical receiver. An optical receiver usually comprises a photo-detector which converts incoming optical signals into electrical output signals for processing by downstream signal processing circuitry. A photo-detector usually comprises a semi-conductor absorbing layer. When optical signals of an appropriate wavelength impinge on the absorbing layer of a photo-detector, electron-hole pairs will be created. Bias-voltage at the terminals of the photo-detector will accelerate the carriers in the electric field between the terminals, whereby in-coming light is converted into electric current. A photo-detector may comprise a photo-diode, for example, a PIN diode for an avalanche diode, photo-resistors or, more recently, MSM photo-detectors. Photo-detectors are typically at a pre-determined biasing condition adapted for specific applications.

OBJECT OF THE INVENTION

It is an object of this invention to provide optical receivers with novel applications of photo-detectors. At a minimum, it is an object of this invention to provide the public with a useful choice of application of photo-detectors.

SUMMARY OF THE INVENTION

Broadly speaking, the present invention has described an optical receiver comprising a photo-detector, wherein said photo-detector is modulated whereby it has a time-variant photo-responsivity following the modulation on the photo-detector.

According to a preferred embodiment of the present invention, there is provided a distance measuring means comprising an optical system of as described herein, wherein modulation of said optical receiver and the modulated optical signals transmitted by said optical transmitter have the same modulation frequency.

According to another aspect of this invention, there is provided an optical system comprising an optical transmitter and an optical receiver as described herein, wherein said optical transmitter comprises an optical source which transmits modulated optical signals, modulation of said optical receiver and said optical transmitter is of the same format.

Preferably, said the photo-detector is pulse modulated and the photo-response of said photo-detector follows the pulse modulation applied to said photo-detector.

Preferably, photo-responsivity of said photo-detector is bias-voltage dependent, modulation is applied to said photo-detector to vary the photo-responsivity of said photo-detector for signal detection.

Preferably, polarity of bias-voltage polarity of said photo-detector is reversible, polarity of photocurrent output of said photo-detector is reversible and is dependent on the polarity of said bias-voltage.

Preferably, said photo-detector is pulse modulated.

Preferably, said photo-detector is pulse modulated with alternate on and off pulses.

Preferably, said photo-detector is turned on and off respectively by said on and off pulses.

Preferably, said photo-detector comprises a MSM photo-detector.

Preferably, pulse modulation is applied to terminals of said photo-detector.

Preferably, modulation of said optical receiver and the modulated optical signals transmitted by said optical transmitter have the same modulation frequency.

Preferably, modulation of said optical receiver and the modulated optical signals transmitted by said optical transmitter are rectangular pulses of the same period and pulse width (T).

Preferably, modulation of said optical receiver and the modulated optical signals transmitted by said optical transmitter have a constant phase relationship.

Preferably, wherein modulation of said optical receiver and the modulated optical signals transmitted by said optical transmitter are anti-phased.

Preferably, modulation of said optical receiver and the modulated optical signals transmitted by said optical transmitter have a constant phase difference.

Preferably, distance information of an object is obtained upon reception of modulated optical signals transmitted by said optical transmitter by said optical receiver after the optical signals are reflected from said object.

Preferably, distance information is obtained by comparing photocurrent output of said photo-detector when said photo-detector is modulated and when said photo-detector is un-modulated.

Preferably, the distance of an object is determined by varying the pulse width of the light source and by detecting the maxima or minima of photocurrent output of said photo-detector.

Preferably, the distance of multiple reflection points is determined by evaluating several relative minima in the optical response function.

Preferably, the distance of an object is determined by varying the delay time of the gating function and detecting the maximum of the modulated photocurrent as function of the delay time.

Preferably, the distance of multiple reflection points is determined by evaluating relative maxima in the optical response function.

BRIEF DESCRIPTION OF THE DRAWINGS

Preferred embodiments of the present invention will be explained in further detail below by way of examples and with reference to the accompanying drawings, in which.

DETAILED DESCRIPTION OF THE PREFERRED EMBODIMENTS

Photo-detectors in conventional optical receivers are typically biased at a constant DC bias-voltage to prepare for reception of incoming optical signals. A bias-voltage is applied to a photo-detector to accelerate electron and hole pairs according to the polarity of the applied electric field to produce photo-current output. For conventional photo-detectors, bias-voltage of a specific and constant polarity must be applied to the terminals of the photo-detector in order to generate a correct electric field for meaningful photo-detection. During normal photo-detection operations, a photo-detector is usually reverse biased.

Figure 1:
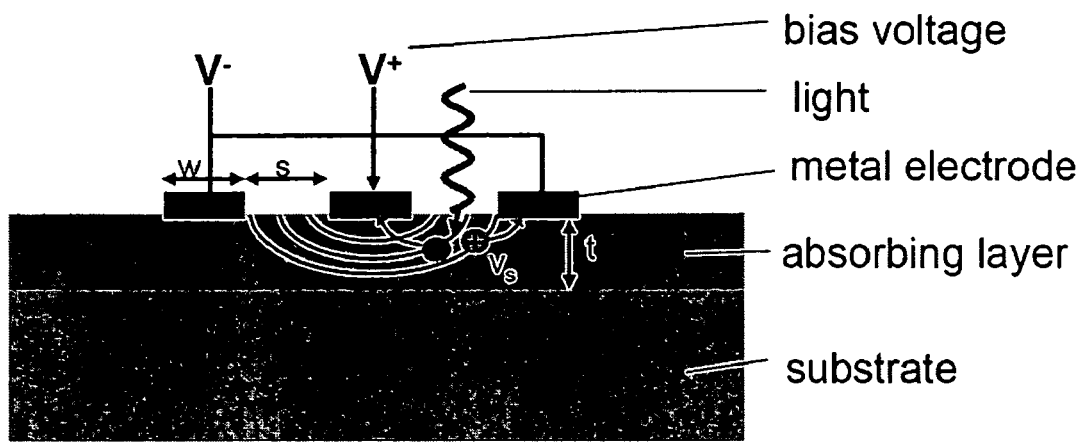
FIG. 1 is a cross-sectional view of a typical MSM photo-detector.

Metal-semiconductor-metal (MSM) photo-detectors have been used for light detection in fibre optic systems for many years. A typical MSM photo-detector is shown in FIG. 1 and comprises inter-digitated electrodes which are deposited on an absorbing layer. The absorbing layer can be, for example, undoped GaAs. An exemplary MSM photo-detector is described in U.S. Pat. No. 5,461,246 which is incorporated herein by reference.

Figure 2:
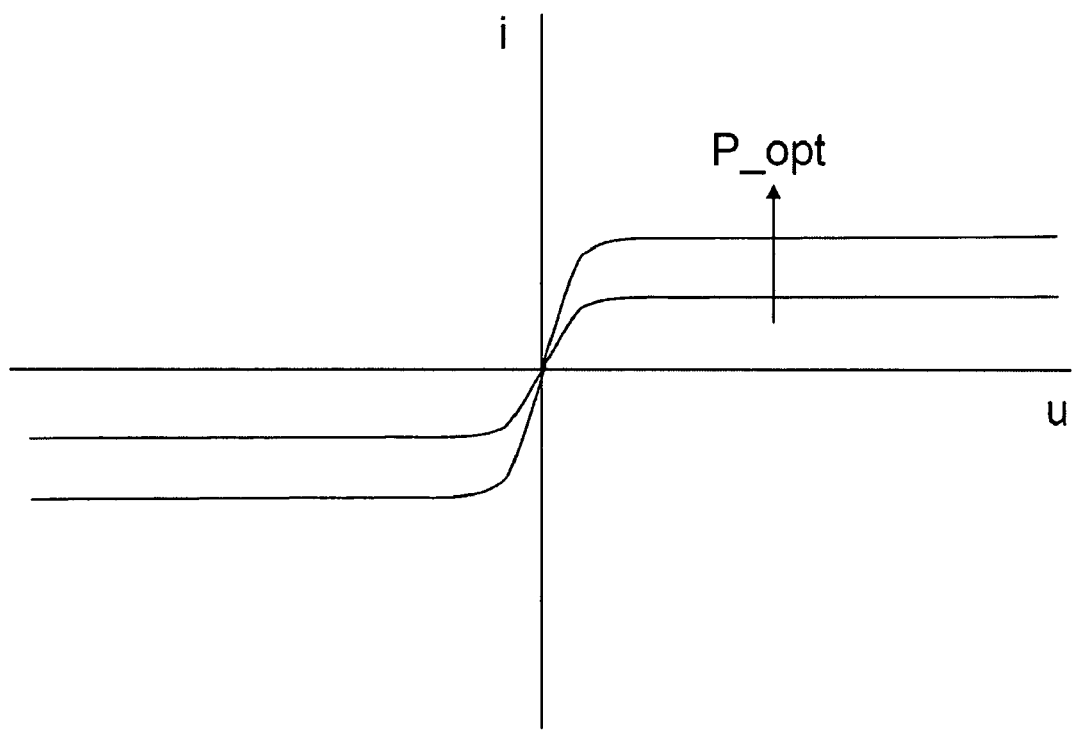
FIG. 2 shows photo-current output vs. voltage characteristics of a typical MSM photo-detector.

Due to the symmetric structure of a MSM photo-detector, the I-V characteristics of an ideal MSM photo-detector have positive/negative symmetry with respect to bias-voltage, as shown in FIG. 2. When light of an appropriate wavelength impinges on a MSM device, the direction of the resulting photo-current will depend on the polarity of the voltage bias. The direction of photo-current will be reversed if the polarity of the bias-voltage is reversed.

In conventional non-MSM photo-detectors, carriers are generated proximal to the metal electrodes where a built-in electrical field due to metal Schottky contact on the semi-conductor surface exists. On the other hand, due to the highly symmetrical structure of a MSM photo-detector, random carriers generated under un-biased conditions will be cancelled out by similar carrier motions occurring at the other electrode. As a result, there is no net induced current output from a MSM photo-detector at zero biased voltage. This unique characteristic of MSM photo-detectors is advantageous for use in an optical receiver, especially an optical receiver for distance measurements.

Figure 3:
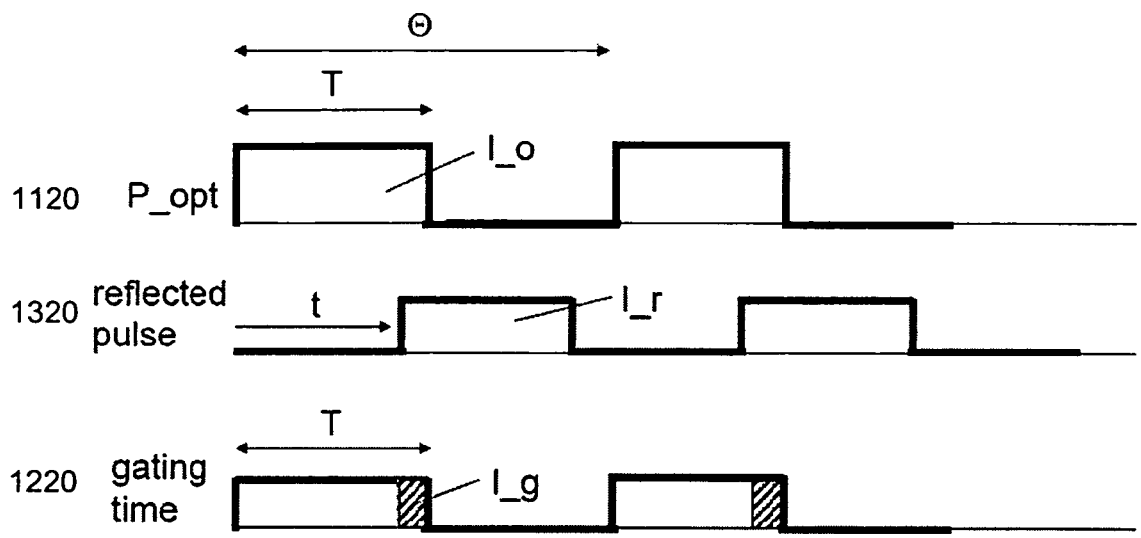
FIG. 3 illustrates timing diagrams of transmitted signal, reflected signal and photo-detector gating time of a first preferred application of its invention.
Figure 4:
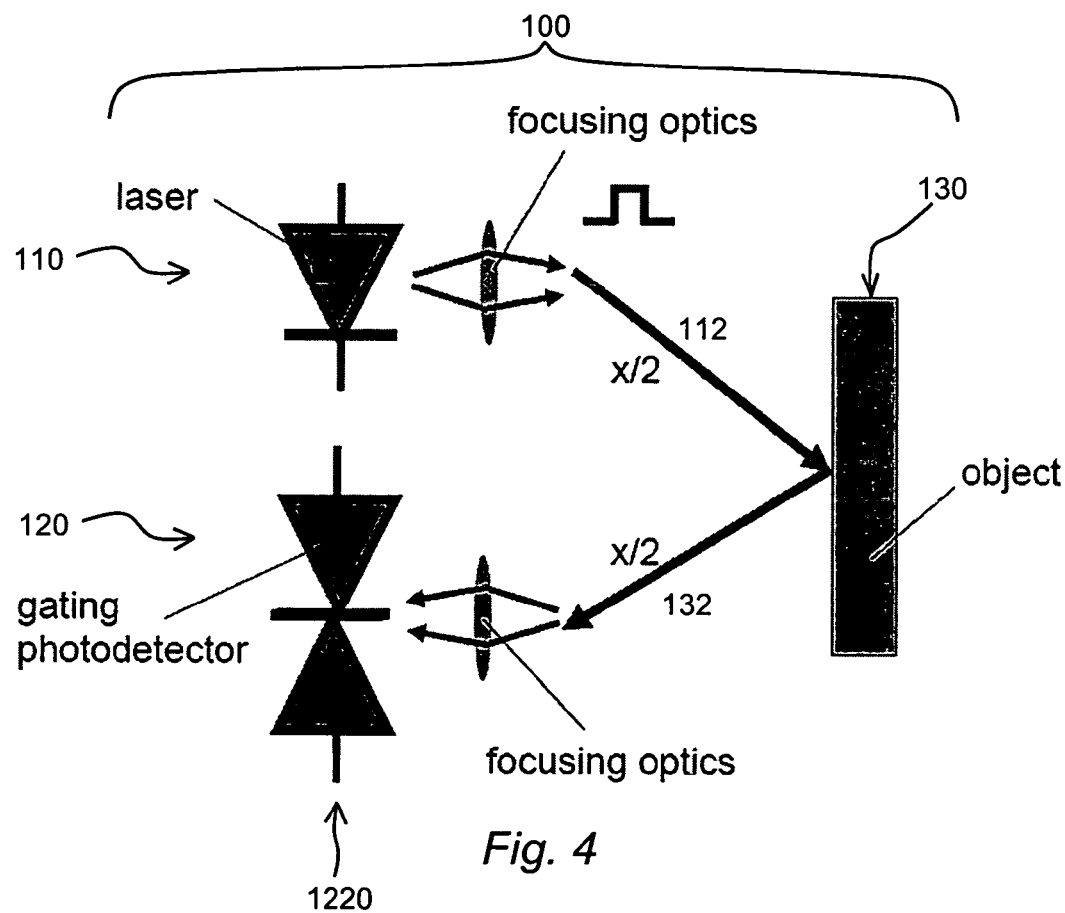
FIG. 4 illustrates a schematic system configuration of a first preferred embodiment of this invention.

Referring to FIGS. 3 and 4, there is shown a first preferred embodiment of this invention for distance measuring applications. Referring to FIG. 4, the distance measuring system comprises an optical transmitter 110 and an optical receiver 120. The optical transmitter transmits optical signals towards a remote object 130, the distance of which is to be measured. Optical signals reflected by the remote object 130 are received by an optical receiver 120. Distance information of the remote object 130 is obtained by reference to the temporal relationship, or more specifically, temporal differences, between the originally transmitted signals and the signals received by the optical transmitter after reflection by the remote object 130.

Referring to the timing diagrams of FIG. 3, modulated optical signals 1120 are generated and then transmitted by an optical source of the optical transmitter 110. The optical source may comprise laser or a LED. The modulated optical signals are transmitted towards the remote object 130 and are reflected towards the optical receiver 120 for reception. The optical signals 1120 will have travelled a total distance x before the signals are received by the optical receiver 120, assuming that the remote object 130 is distant from both the optical transmitter 110 and the optical receiver 120 so that the separation between the optical transmitter 110 and the optical receiver 120 is negligible. Of course, the difference travelled by the transmitted and reflected can be un-equal and the difference can be accounted for using ordinary arithmetic principles without loss of generality. When the modulated signals are received by the optical receiver, the time shift or delay (t) between the reflected signal stream 1320 and the originating signal stream 1120 will represent the time required to cover the total distance x, which is twice the separation between the optical receiver and the remote object in this example.

Since the speed of light in a medium of a reflective index n is c/n, where c is the speed of light in vacuum which is equal to $3 \times 10^8$ ms$^{-1}$, the time that is required for light to travel a distance x is t=nx/c. By tracking the time required for light to travel from the optical transmitter to the optical receiver via the remote object 130, the total distance travelled, namely, x, and the distance of the remote object, that is, x/2, can be found. As shown in FIG. 3, the reflected optical pulses 1320 arrive at the optical receiver 120 with a time delay t with respect to the originally transmitted signal 1120. This time delay represents the time required for light to travel from the optical transmitter to the optical receiver. The application of this timing relationship to derive the total distance x travelled by the optical signal (and, hence, the separation distance between the remote object 130 and the optical receiver 120, namely, x/2) will be explained below.

When a photo-detector of the optical receiver 120 is biased with a DC voltage so that the photo-detector is always turned on, the reflected optical signals 1320 will be detected and time-averaged photo-current output of the photo-detector will be constant irrespective of the time delay t. On the other hand, the time-average photo-current output of the photo-detector can be varied by gating the photo-detector with a modulated signal which defines a time-variant or time-dependent photo-responsivity. The term time-variant, or time-dependent, in this specification means a photo-responsivity which is not constant but is variable within a specific period of time, that is, within a cycle. The term "gating" here means applying a biasing voltage to the control terminal(s) of a photo-detector to vary the photo-responsivity of the photo-detector. In an exemplary gating application as shown in the gating diagram 1220 of FIG. 3, the photo-detector is gated by modulation signals which are identical to the timing characteristics of the transmitted optical signal. Similar to the transmitted signals, a binary gating modulation function is used and the photo-detector is turned off during the off time of the modulation, which corresponds to a low modulation voltage.

Figure 5:
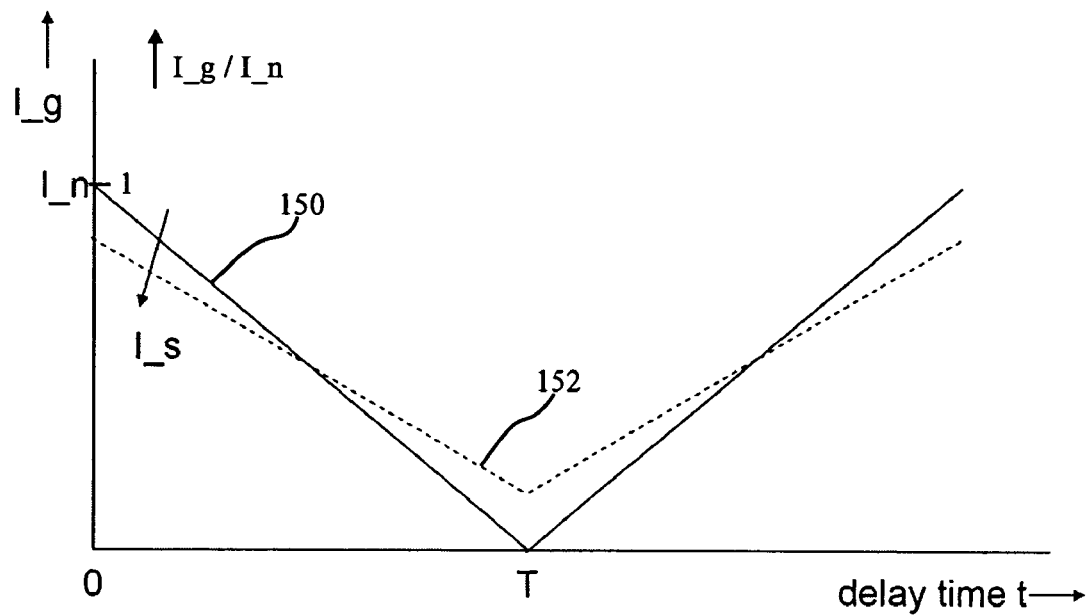
FIG. 5 is a graph showing the variation of detected photo-current vs. delay time with reference to the arrangement of FIGS. 3 and 4.

When there is no time delay between the transmitted signals 1120 and the reflected signal 1320, (i.e., t=0), the time-average photo-current output of the photo-detector will be equal to the time-average photo-current output (I_n) of the photo-detector with a constant DC bias-voltage which turns the photo-detector on to operate at a pre-determined photo-responsivity. As the delay time t increases, the photo-current output (l_g) by the gated photo-detector decreases. As shown in FIG. 5, the photo-current output of the gated photo-detector decreases linearly from the maximum detection when t=0 to the minimum detection when t=T, that is, when the transmitted and reflected optical signals are anti-phased. When the time delay t exceeds the pulse width T of the transmitted optical signal, photo-current output from the optical receiver will increase and will reach a maxima when the time delay t equals the period of the transmitted signals. Because the photo-current output and the time delay exhibits a linear relationship between t=0 to T and is given by the relationship l_g=((T−t)/T)l_r=(1−t/T)l_r, where l_g is the gated intensity and l_r is the reflected intensity with no gating function on, the time delay t can be ascertained by the ratio l_g/l_r for time delay t<T.

A MSM photo-detector is employed in this example because it gives no photo-current output when the bias-voltage is zero. When conventional or non-MSM type photo-detectors are used, instead of just turning off the bias-voltage to the photo-detector to correspond to the "Off" time of the transmitted pulse, the photo-detector can be biased at a lower voltage, rather than at zero bias-voltage as in the case of a MSM photo-detector so that the minima of the photo-detector will still occur at delay t=T. The dotted graph 152 of FIG. 5 shows an exemplary photo-detector output when there is stray light (l_s). When there is stray light, the detected light by gating the photo-detector becomes l_g=(1−t/T) (l_n−l_s)+T/θ l_s. However, as long as the amount of stray light is not too significant, the minima still occurs at t=T and the total travelled distance x=c/n (1−l_g/l_n) T. Hence, by modulating the photo-detector so that the biasing voltage of the photo-detector corresponds to the modulation of the modulated optical signal 1120. The distance of a remote object can be measured. Furthermore, by calibrating the optical receiver with an un-gated photo-detector (that is, the photo-detector is always biased to operate at the high biasing voltage level), the distance information can be obtained by the ratio (1−l_g/l_n) as shown in the above equation.

Figure 6:
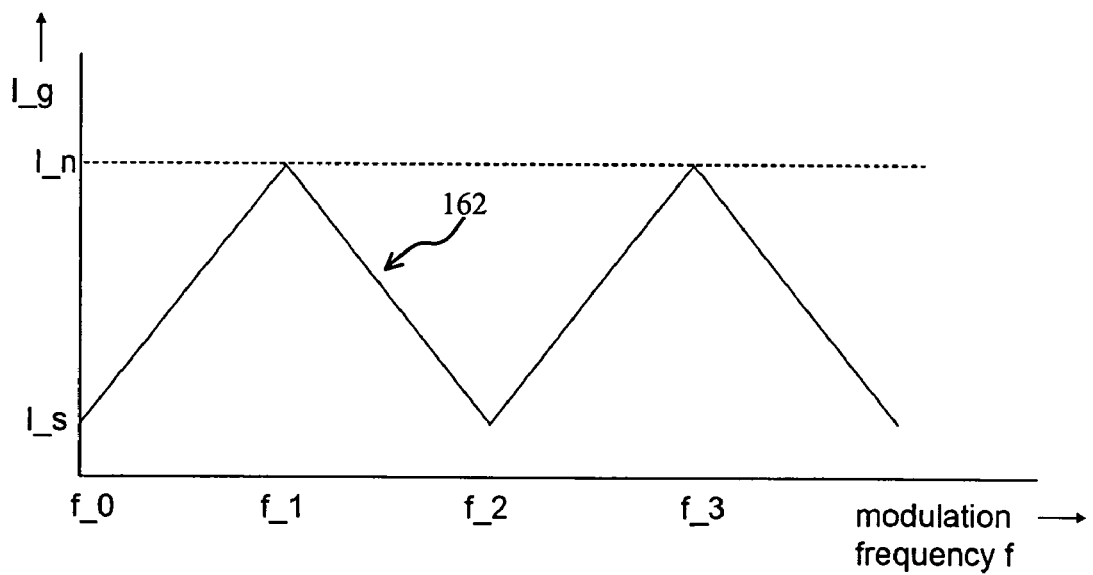
FIG. 6 is a graph showing the variation of detected photo-current vs. variation in modulation frequency of a second preferred embodiment.

As an alternative to the distance measuring method described above, the distance of a remote object can be measured by the arrangement of FIG. 4 by variation of the modulation gating frequency of the MSM photo-detector. In this alternative, the gating modulation function is initially set to be anti-phased to the laser output modulation so that there is a 180° phase shift between the gating modulation function and the laser output source. When the distance x between the optical transmitter and the optical receiver is zero, only photo-current due to incident stray light (l_s) is generated by the photo-detector. Because the gating modulation function of the optical detector and the signal modulation of the optical transmitter are of the same fundamental frequency (f_0) but is anti-phased, the photo-current output at x=0 will be a minima as shown on the y-intercept. Assuming that the gating modulation function comprises a train of symmetrical pulses so that each period has half on-time and half off-time so that the on-time T is related to the modulation frequency f by f=1/(2T). By increasing the frequency of the gating modulation function, the photo-current output intensity l_g will increase until it reaches a maxima at frequency f_1 when the photo-current output of the photo-detector is equal to the photo-current output (l_n) of an ungated photo-detector. The frequency f_1 at which the first photo-current output maxima is related to the distance x by: x=c/(2f). When the gating modulation frequency further increases, the output photo-current intensity l_g decreases until it reaches a minima at the frequency f_2 wherein f_2=2c/(2f), as shown by graph 162 of FIG. 6. At this frequency minima, the intensity of the photo-current output l_g again corresponds approximately to the ambient stray light detected. This periodic relationship between the gated photo-current signal (l_g) and frequency will repeat at odd and even harmonics of the fundamental frequency f_0. Exemplary relationship between the total distance x and the first (f_1) and second (f_3) maxima are set out in table below in which f_3 is 3×f_1.

| x [m] | f_1 [MHz] | f_3 [MHz] |
|---|---|---|
| 0.10 | 1500 | 4500 |
| 0.30 | 500 | 1500 |
| 1 | 150 | 450 |
| 10 | 15 | 45 |
| 100 | 1.5 | 4.5 |

By tracking the occurrence of the frequencies of the first and the second frequency maxima, the total distance x can be calculated. Since the total distance x in the arrangement of FIG. 4 is twice the distance of the object from the light source and the photo-detector, the total travel distance x can be calculated by the relationship: x=c/(2f) [1−l_g/l_n]. Thus, the distance of an object can be determined from a single data point as long as the instantaneous gating modulation frequency is smaller than the first resonant frequency f_1 of the first photo-current output maxima. For example, if the first maxima occurs at f_1 of 1.5 Mhz, the corresponding total travel distance x will be equal to 100 m in air.

Multiple maxima and minima frequency points can be utilized to enhance the accuracy of measurement as a variation to this method. For example, the first frequency maxima f_1 can be obtained by linear extrapolation of a plurality of data points between f_0 and f_1. Additional data points between f_1 and f_2 can be collected and processed for extrapolating the maxima and/or minima to further enhance accuracy. By tracking the relative maxima and minima, adverse influence due to stray light can be mitigated.

Figure 7:
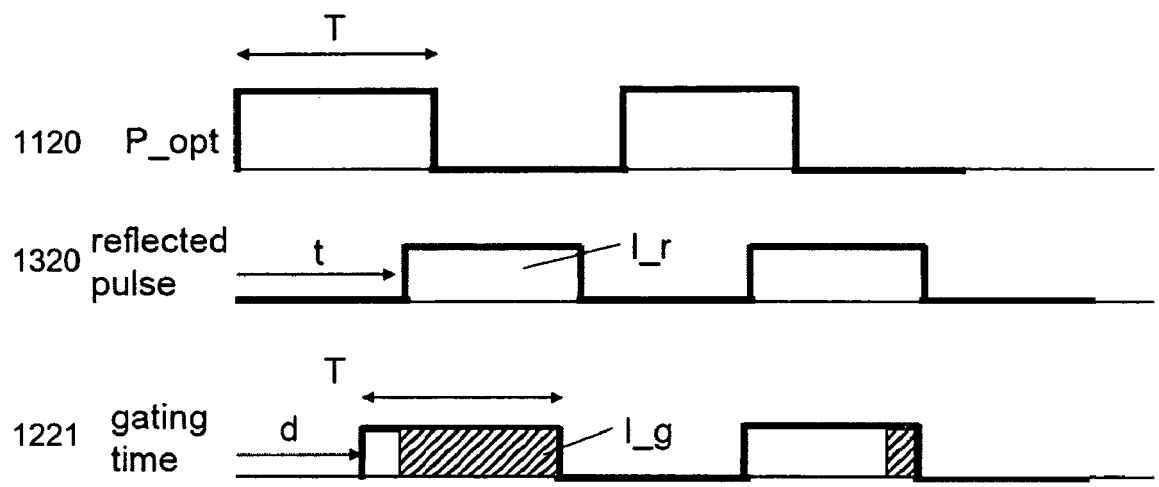
FIG. 7 shows timing diagram relationship between transmitter signals, reflected signals and photo-detector gating time in which the delay of the photo-detecting gating time is varied of a third preferred embodiment.
Figure 8:
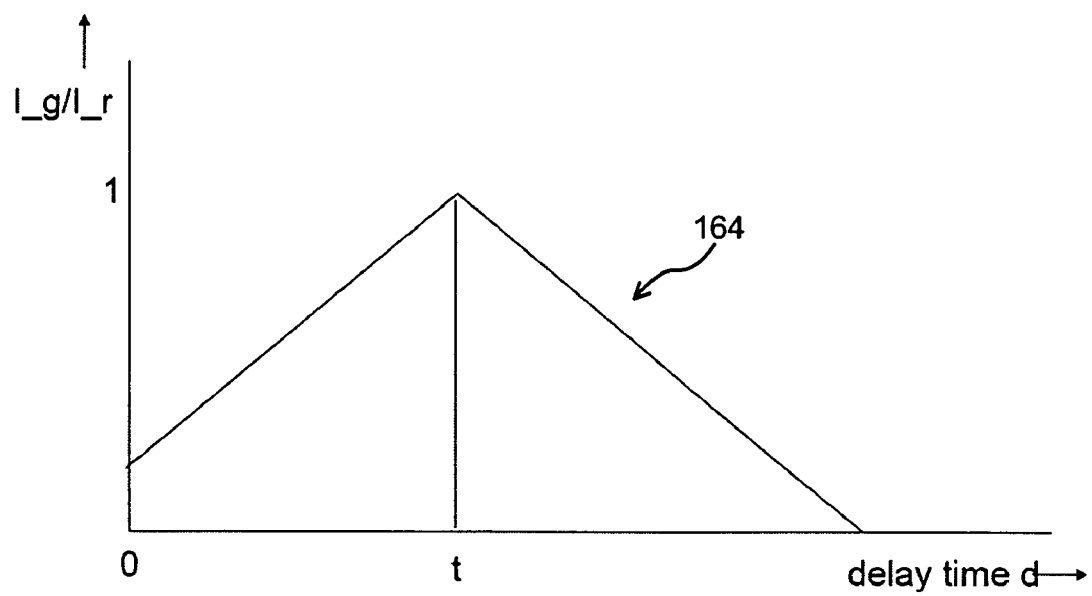
FIG. 8 shows a graph of variation of detected photo-current vs. delay time d of the photo-detector gating time of FIG. 7 showing a second preferred embodiment of this invention.
Figure 9:
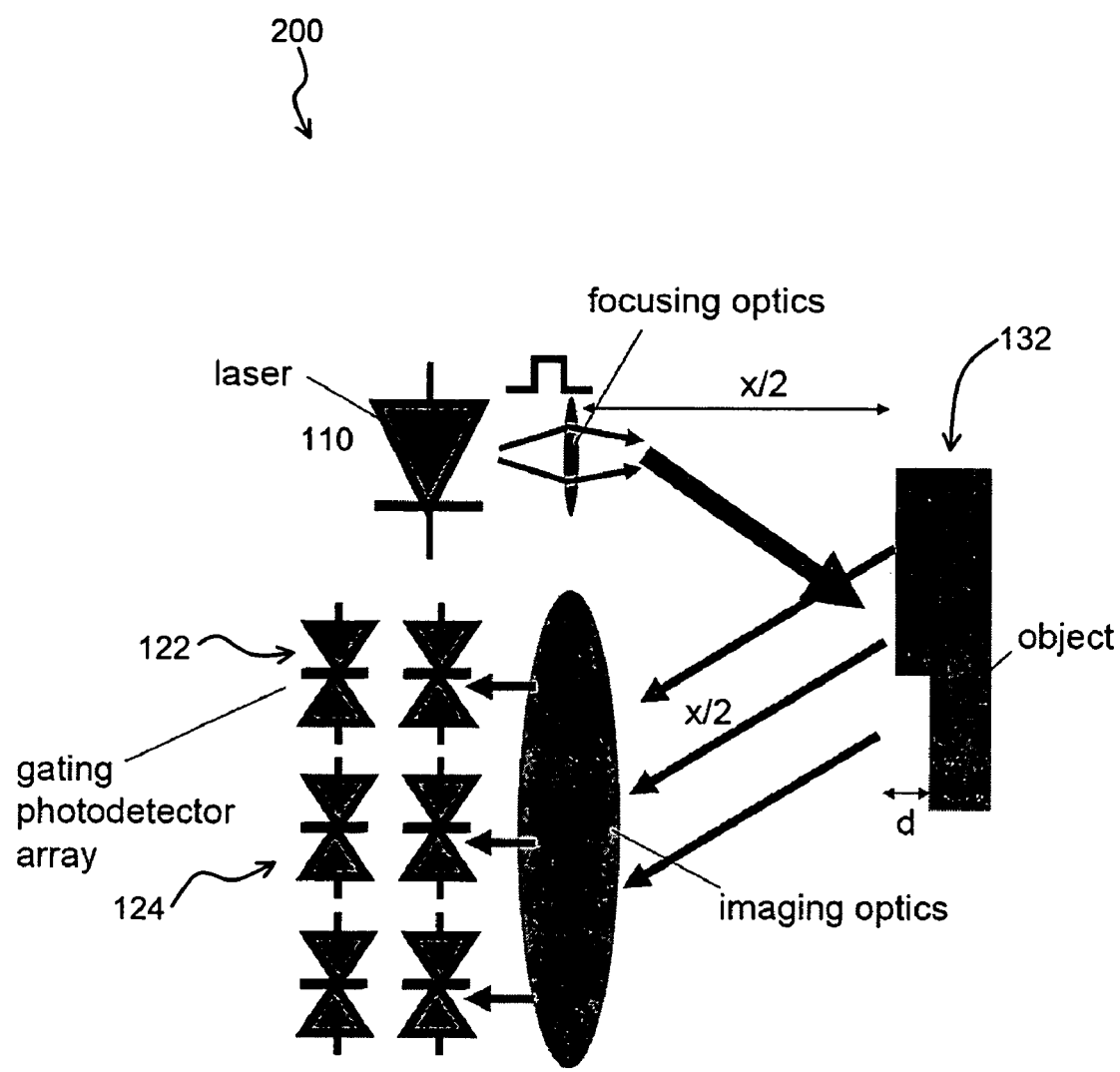
FIG. 9 illustrates an exemplary application of this invention on a three-dimensional object.

In a second preferred application of this invention and still with reference to the arrangement of FIG. 4, the distance of a remote object is measured by varying the delay time of the gating modulation function of the photo-detector. As can be seen from the pulse-timing diagrams 1221 and 1320, corresponding respectively to the gating modulation pulses and the received reflected pulses of FIG. 7, because the pulse width of the reflected pulse of 1320 and the gating pulse 1221 have the same pulse width and pulse period, the photo-detector output will be maximum when the on-pulses overlap. By varying the delay time of the gating modulation function 1221 with respect to the modulation signal of 1120 of the optical transmitter and track for the occurrence of the maxima, the time t required for light beam to travel a total travelling distance x would be equal to d=t, as shown in graph 164 of FIG. 8. As a convenient example, the time of occurrence of the maximum photo-detector output can be evaluated from the second derivative of the function photo-current output vs. delay time. In addition, it will be appreciated that the delay time and therefore the distance x/2 can be obtained by measuring the time-average values of the optical signals l_n, l_s and l_g.

In a third preferred embodiment of this invention, a three-dimensional imaging of a remote object can be measured by one and two dimensional photo-detector arrays. The difference in the distance travelled by light between the various surfaces of a remote object to the photo-detector arrays will provide three-dimensional information of the remote object.

In a fourth preferred embodiment, the optical transmitter 110 and optical receiver 120 of FIG. 4 can be set up for distance measurement without requiring reflection from an object. For example, the length of an optical fibre cable can be measured by connecting optical fibre of length x between the optical transmitter and the optical receiver. The total length of the optical fibre x can be measured by comparing the photocurrent output of the gated photo-detector and by applying the above relationships mutatis-mutandis without loss of generality.

Although square or rectangular pulse modulation are used in the examples, it will be appreciated that other pulse shape, for example, half-sinusoid, Gaussian or other pulse shapes can be used and the distance-delay time relationship can be calculated using known algorithms.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to a MSM photo-detector, it should be appreciated that the invention can apply, whether with or without modification, to other photo-detectors without loss of generality.

The invention claimed is:

1. A distance measuring apparatus comprising:
   an optical transmitter comprising an optical source for transmitting modulated optical signals towards a remote object, and
   an optical receiver for detecting said modulated optical signals upon reflection from said remote object, said optical receiver comprising a photo-detector which is configured for gated detection of optical signals by applying gating signals to said photo-detector, the gating signals being arranged to be in a constant time or phase relationship with said modulated optical signals;
   said optical receiver being arranged to calculate the distance of said remote object with reference to delay information between transmitted and detected optical signals, and
   wherein the distance of the remote object is determined by varying a delay time of the gating function of the photodetector and detecting a maximum of the modulated photocurrent as a function of the delay time.

2. A distance measuring apparatus according to claim 1, wherein the optical signals transmitted by said optical transmitter are pulse modulated and said photo-detector is gated by pulse modulated signals.

3. A distance measuring apparatus according to claim 2, wherein said photo-detector is pulse modulated with alternate on and off pulses.

4. A distance measuring apparatus according to claim 3, wherein the photo-responsiveness of said photo-detector is turned on and off respectively by said on and off pulses.

5. A distance measuring apparatus according to claim 4, wherein said photo-detector comprises a MSM photo-detector.

6. A distance measuring apparatus according to claim 5, wherein pulse modulation is applied to gate terminals of said photo-detector.

7. A distance measuring apparatus of claim 2, wherein modulation signals to be applied to said optical receiver and said optical transmitter are of the same modulation format.

8. A distance measuring apparatus according to claim 1, wherein modulation signals applied to said optical receiver and the modulated optical signals transmitted by said optical transmitter have the same modulation frequency.

9. A distance measuring apparatus according to claim 8, wherein modulation of signals applied to said optical receiver and the modulated optical signals transmitted by said optical transmitter includes rectangular pulses of the same period and pulse width (T).

10. A distance measuring apparatus according to claim 8, wherein modulation of said optical receiver and the modulated optical signals transmitted by said optical transmitter have constant phase relationship.

11. A distance measuring apparatus according to claim 8, wherein gating signals of said optical receiver and the modulated optical signals transmitted by said optical transmitter are 180 degrees out of phase.

12. A distance measuring apparatus according to claim 8, wherein gating signals of said optical receiver and the modulated optical signals transmitted by said optical transmitter have a constant phase difference.

13. A distance measuring apparatus according to claim 1, wherein gating modulation of said optical receiver and the modulated optical signals transmitted by said optical transmitter have a constant phase difference.

14. A distance measuring apparatus according to claim 1, wherein distance information of an object is obtained upon reception of modulated optical signals transmitted by said optical transmitter by gated detection at said optical receiver after the optical signals have been reflected from said object.

15. A distance measuring apparatus according to claim 1, wherein distance information of said remote object is obtained by comparing photocurrent output of said photo-detector when said photo-detector is modulated by gating signals and when said photo-detector is un-modulated.

16. A distance measuring apparatus according to claim 1, wherein said optical source is modulated by a modulating signal for optical transmission towards said remote object, and said photo-detector is also gated by another modulating signal having similar characteristics of the modulating signal which modulates the optical source.

17. A distance measuring apparatus according to claim 16, wherein said modulating signal comprises on- and off-pulses.

18. A distance measuring apparatus according to claim 17, wherein the output of said photo-detector is at a minima when the delay between said transmitted and detected optical signals equals the duration of the on-pulse of said modulating signal.

19. A distance measuring apparatus according to claim 17, wherein the output of said photo-detector is proportional to the delay between said transmitted and detected optical signals when the delay time is less than or equal to the duration of the on-pulse of said modulating signal.

20. A distance measuring apparatus according to claim 1, wherein said optical receiver is configured to determine said delay information by measuring the time-average of the detected photo-current output of said gated photo-detector.

21. A distance measuring apparatus according to claim 1, wherein said delay information is obtained by varying the frequency of said gating signals with respect to the frequency of said modulated signals of said optical source.

22. A distance measuring apparatus according to claim 1, wherein said delay information is obtained by varying the delay time of said gating signals with respect to said modulated signals of said optical source.

* * * * *